Dec. 29, 1936.  F. J. RAMSEY  2,065,737
HYDRAULIC TRANSMISSION
Filed Jan. 13, 1934   7 Sheets-Sheet 3

Inventor:-
Fred J. Ramsey
by his Attorneys
Howson & Howson

Dec. 29, 1936.   F. J. RAMSEY   2,065,737
HYDRAULIC TRANSMISSION
Filed Jan. 13, 1934   7 Sheets-Sheet 4

Dec. 29, 1936.  F. J. RAMSEY  2,065,737
HYDRAULIC TRANSMISSION
Filed Jan. 13, 1934  7 Sheets-Sheet 5

Inventor:
Fred J. Ramsey
by his Attorneys
Howson & Howson

Patented Dec. 29, 1936

2,065,737

UNITED STATES PATENT OFFICE 2,065,737

HYDRAULIC TRANSMISSION

Fred J. Ramsey, Harrisburg, Pa.

Application January 13, 1934, Serial No. 706,566

3 Claims. (Cl. 192—61)

The object of this invention is to provide a hydraulic variable transmission mechanism suitable for use in motor vehicles and having certain novel and desirable operating and structural characteristics hereinafter clearly set forth.

Figures 1, 13:
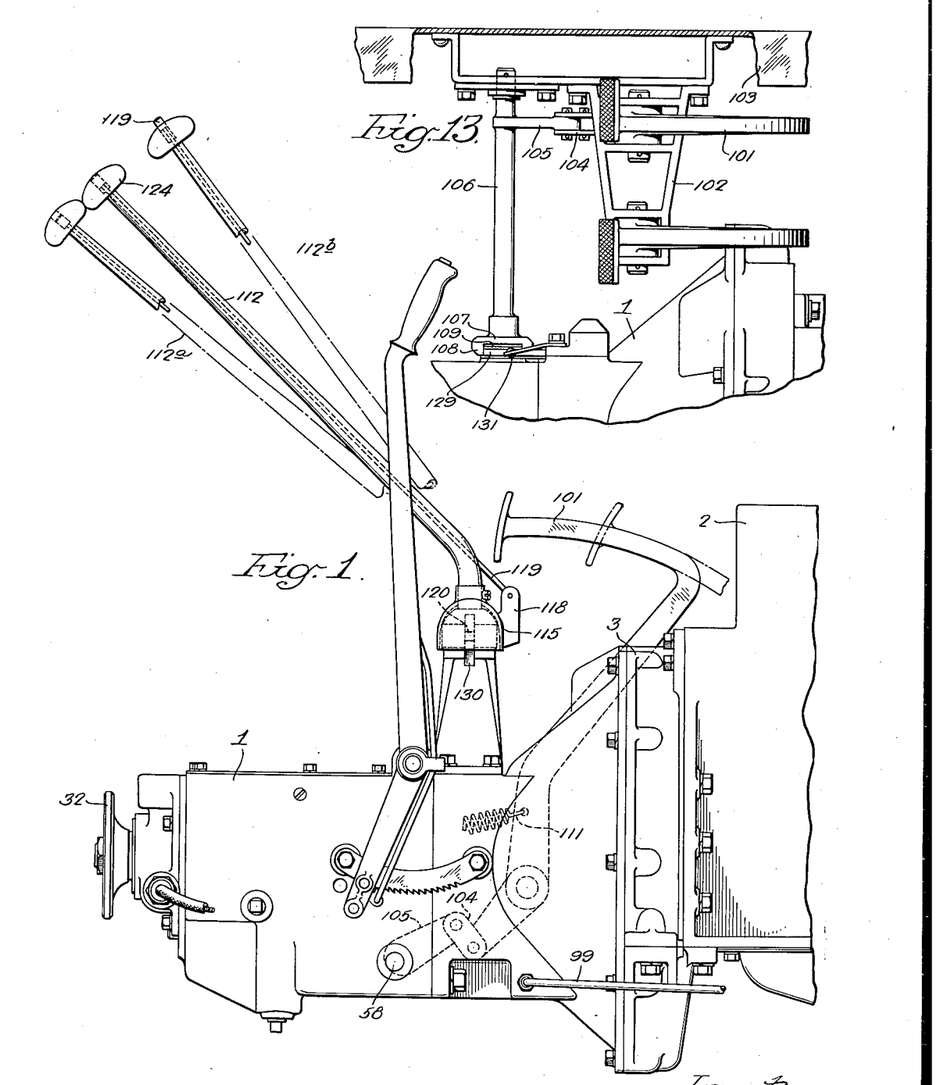
Figure 1 is a side elevational view of the transmission in an embodiment adapted primarily to motor vehicles.
Fig. 13 is a fragmentary plan and partial sectional view of the assembly shown in Fig. 1.
Figure 2:
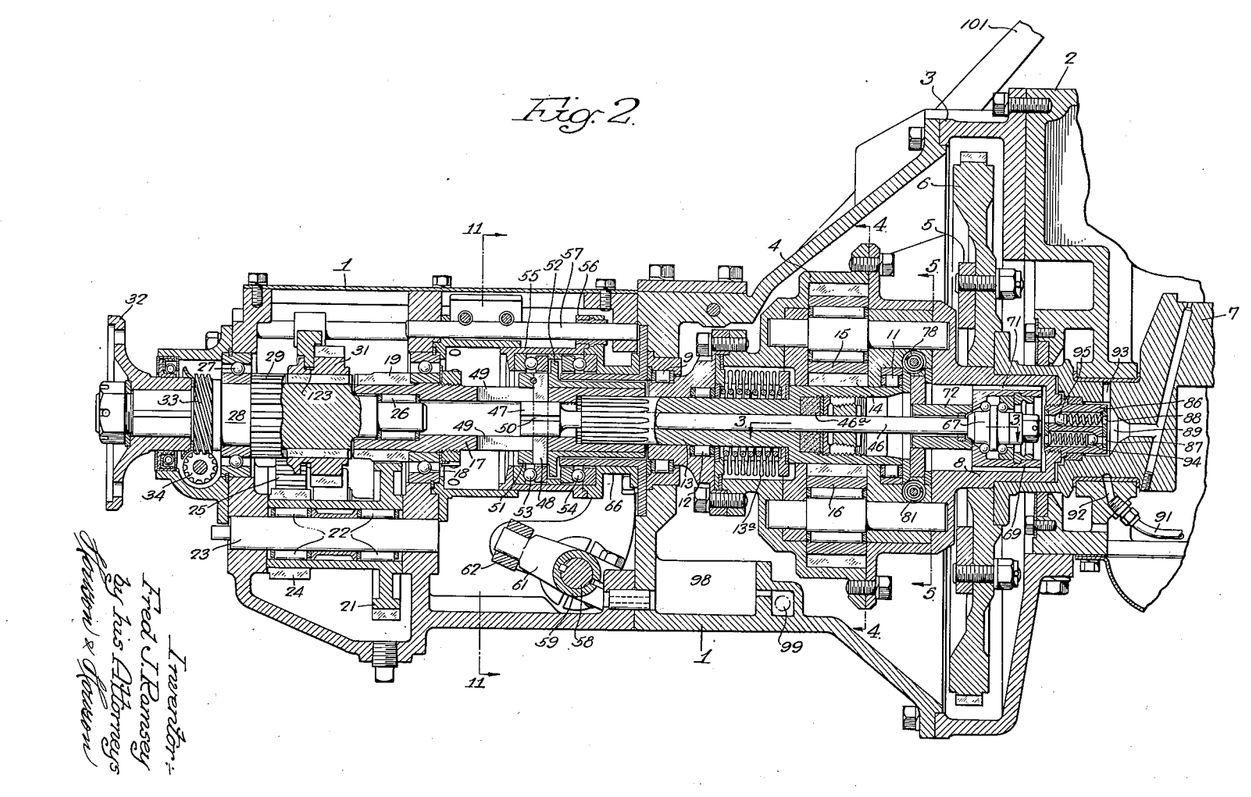
Fig. 2 is a longitudinal midsectional view of the transmission.

With reference to the drawings, my transmission in a preferred embodiment comprises a housing 1 which is shown connected to the rear end of a motor block 2 through the medium in the present instance of a fly wheel housing 3. Rotatably mounted within the housing 1 is a casing 4, the forward end of which is connected through a coupling 5 to a fly wheel 6, which in turn is connected in the usual manner with the crank shaft 7 of the motor. The forward end 8 of the casing 4 is supported in the rear end of the crank shaft 7, and the rear end of the casing is supported in roller bearings 9 in the housing 1. Journaled concentrically in the casing 4 on bearings 11, 12 is a shaft 13, the inner end of which carries a toothed gear 14; and meshing at diametrically opposite sides respectively with this gear 14 are gears 15 and 16 which are journaled for free rotation within the casing 4. With certain elements hereinafter described, the casing 4 and the gears 14, 15 and 16 constitute elements of a gear pump through the medium of which torque is transmitted from the crank shaft 7 of the motor to the shaft 13. The outer or rear end of the shaft 13 enters and supports the forward end of a hollow shaft 17 and is splined thereto; and the rear end of the shaft 17 is journaled in the housing 1 on bearings 18. The shaft 17 has at its rear end a pinion 19 which meshes with a gear 21 journaled on roller bearings 22 on a jack shaft 23 supported in the housing 1. The gear 21 has formed integrally therewith a pinion 24 which meshes with an idler gear 25 suitably journaled on the housing 1. Journaled in a roller bearing 26 in the rear end of the hollow shaft 17 and in a bearing 27 in the housing 1 is a stub shaft 28, and this shaft has a toothed portion 29 on which is splined a pinion 31. In one position of adjustment axially of the shaft 28, the pinion 31 meshes with the idler gear 25 so that a driving connection is established through the pinion 19 and gears 21 and 24 between the hollow shaft 17 and the stub shaft 28. In an intermediate position of adjustment, as shown in Fig. 2, the pinion 31 is freed from the idler gear 25 whereby the shaft 28 is disconnected from the shaft 17; and in an advanced position of adjustment the pinion 31 constitutes the movable element of a dog clutch connecting the shaft 17 directly with the shaft 28. The means for adjusting the pinion 31 will be described hereinafter. The rear extremity of the shaft 28 is adapted for reception of a coupling element 32 through which the shaft 28 may be connected to the propeller shaft of the motor vehicle (not shown). The shaft 28 also carries a worm 33 which meshes with a worm wheel 34 through which the usual speedometer and odometer connections may be made.

Figure 3:
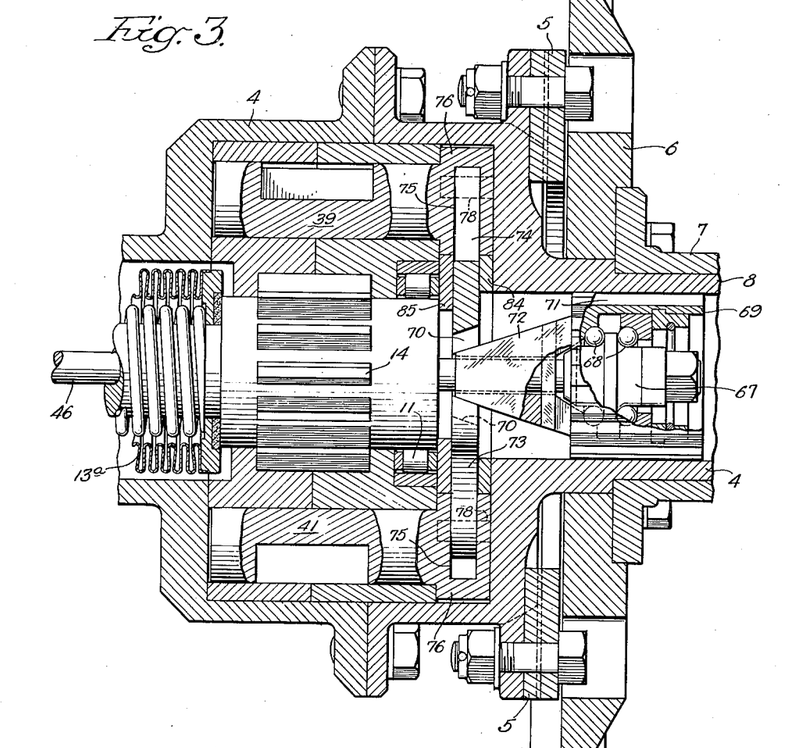
Fig. 3 is an enlarged fragmentary sectional view on the line 3—3, Fig. 2.
Figure 4:
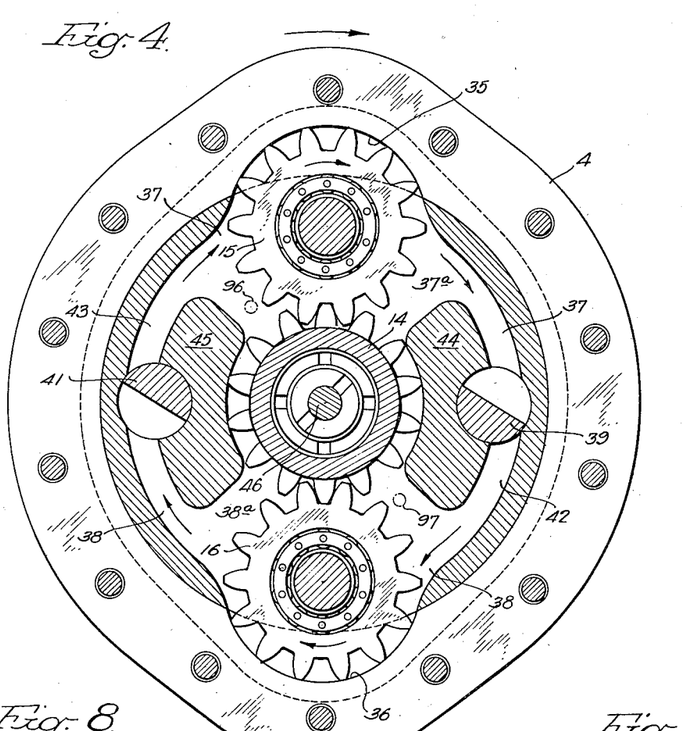
Fig. 4 is a transverse section on the line 4—4, Fig. 2.

Referring to Figs. 3 to 10, inclusive, it will be noted that the gears 15 and 16 are established in recesses 35 and 36 in the casing 4, and that the interior space of the casing which the gears occupy is in effect divided by the gears 14, 15, 16 into two main chambers 37 and 38. The relation of the casing and the gears is such that rotation of these gears with respect to the casing tends to set up by gear pump action a positive circulation of liquid contained within the casing through the chambers 37 and 38, as indicated by the arrows in Fig. 4. This circulation can be retarded and substantially interrupted by means of a pair of valves 39 and 41 which are mounted in channels 42 and 43 formed between the wall of the casing and partitioning elements 44 and 45, the inner surfaces of which lie contiguous to the gear 14, and which thereby confine the circulation to the channels 42 and 43. In one extreme position of adjustment of the valves 39 and 41, the channels 42 and 43 are left unobstructed so that free circulation of the liquid is permitted. In the other extreme positions of adjustment of the valves 39 and 41, as shown in Fig. 4, the channels 42 and 43 are completely obstructed, so that circulation of the liquid through the channels is substantially prevented. Intermediate these two extreme adjusted positions, the valves 39 and 41 may partially obstruct the channels 42 and 43 to any degree desired, thereby variably retarding the circulation of the liquid. Assuming a rotation of the casing 4 in the direction of the arrow, Fig. 4, and with the gear 14 immobilized, the gears 15 and 16 will have a planetary movement, traveling in an orbital path around the gear 14 and at the same time rotating about their individual axes. This latter rotation, as previously set forth, tends to set up the circulation of liquid in the casing, and when the valves 39 and 41 are adjusted to leave the channels 42 and 43 unobstructed, this circulation is a free one, so that little torque is applied to the gear 14. As the valves 39 and 41 are moved toward the channel-closing positions shown in Fig. 4, the circulation is progressively retarded and fluid pressure is progressively built up in those portions of the chambers 37 and 38 designated 37a and 38a. This pressure in turn progressively resists the relative movement between the gears 15 and 16 and the casing 4 until when the valves 39 and 41 are fully closed the gears 15 and 16 are substantially immobilized with respect to the casing. As the valves 39 and 41, therefore, are progressively moved toward their channel-closing positions, the torque imposed upon the gear 14 is progressively increased, and this torque, if sufficient to move the gear 14 and the shaft 13 against the load, will when the valves 39 and 41 are completely closed result in the rotation of the casing and the gears 14, 15 and 16 as a unit.

The valves 39 and 41 are adjusted through the medium of a rod 46 which extends axially through the center of the shaft 13. The enlarged rear end 47 of this rod, see Fig. 1, slides longitudinally in the interior of the hollow shaft 17, and a pin 48 extends transversely through this end portion 47 and projects through longitudinal slots 49 in the said shaft 17. The outer ends of the pin 48 are secured in a sleeve 51 which embraces and slides on the shaft 17, and a flange 52 on this sleeve is confined between thrust bearings 53, 54 in a casing 55 slidably supported in the housing 1 and having at one side an extension 56 which slidably embraces a rod 57 fixed longitudinally in the housing. A rock shaft 58 journaled in the bottom of the housing 1 has keyed thereto a sleeve 59, and this sleeve has a projecting arm 61, the outer cylindrical end of which is engaged in a central aperture in a transversely extending arm 62. The outer cylindrical ends 63 of this arm engage respectively bell crank levers 64, 64 which are journaled on the shaft 58 and confined between the ends of the sleeve 59 and bosses 60 in the housing, and which respectively extend upwardly on opposite sides of the forward end of the casing 55. Transversely extending pins 65 at the upper ends of the levers 64 engage in a circumferential recess 66 in the casing 55, see Fig. 15, whereby actuation of the rock shaft 58 in a manner hereinafter set forth may effect an axial movement of the casing 55 and consequent longitudinal axial adjustment of the rod 46. The connection between the levers 64 and the casing 55, however, is such as to permit free rotation of the said casing regardless of its adjusted position. It will be noted that the cylindrical end portion 47 of the rod 46 is longitudinally grooved at 50 to permit passage of fluid from one side of the end portion when the rod is shifted.

Figure 5:
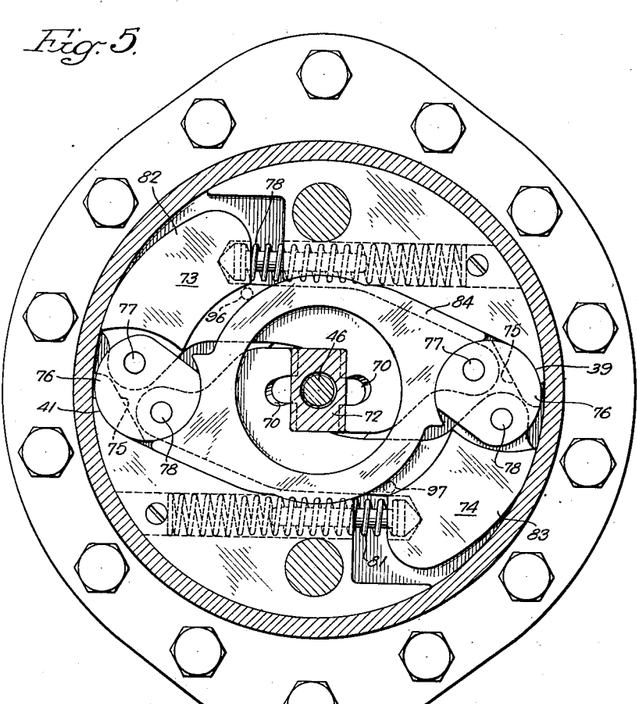
Fig. 5 is a section on the line 5—5, Fig. 2.
Figure 6:
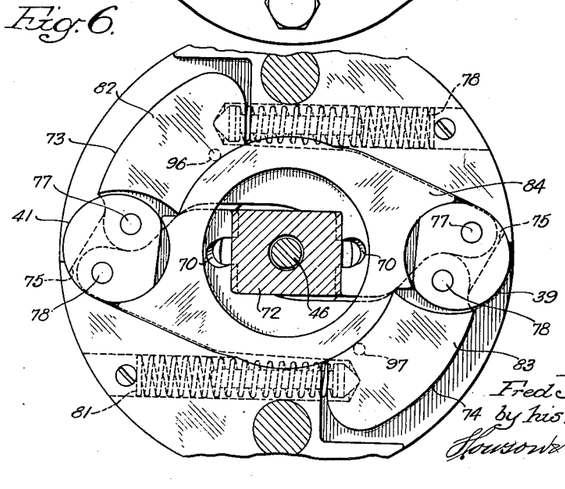
Fig. 6 is a sectional view corresponding to that of Fig. 5 illustrating the parts in an alternative position of adjustment from that shown in the preceding figure.
Figure 7:
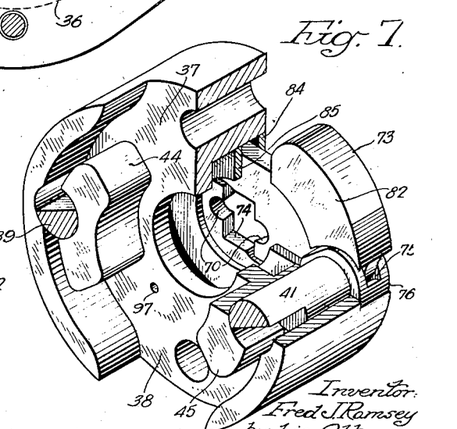
Figs. 7 and 8 are detached views in perspective of the pump housing.
Figure 8:
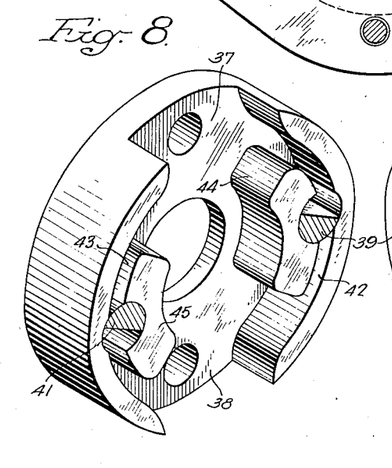
Figures 9, 10:
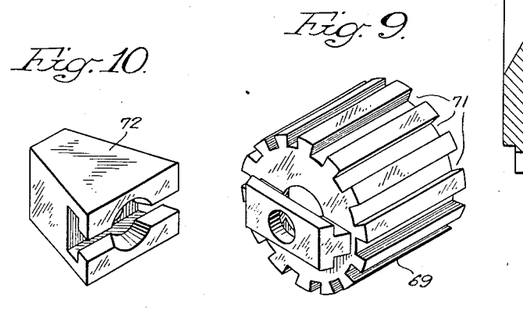
Figs. 9 and 10 are detached views in perspective of elements of the valve control mechanism.

The forward end of the rod 46 has fixed thereon a hub member 67, see Fig. 3, which constitutes an inner race for bearings 68 on which is rotatably mounted a cylindrical member 69. This member 69 is slidably mounted in the forward end of the casing 4, and as shown in Fig. 9 is provided in its peripheral surface with a plurality of longitudinal grooves 71. At its forward end, the member 69 has detachably and adjustably secured thereto a wedge element 72 which is longitudinally apertured for passage therethrough of the rod 46, which rod in assembly prevents displacement of the wedge from its carrier member. The wedge aperture is somewhat larger than the diameter of the rod 46 so that the wedge may have a limited transverse floating movement in its carrier. The wedge 72 is adapted to fit between and to respectively engage oppositely arranged edges of a pair of links 73 and 74, the opposite ends of each of which are pivotally secured respectively in slots 75, 75 in the head portion 76 of the valves 39 and 41. The pivot pins which connect the link 73 to the said valves are indicated in Fig. 5 by the reference numeral 77, and the corresponding pins connecting the link 74 to the valves are indicated by the reference numeral 78. Springs 79 and 81 act respectively upon the links 73 and 74 to resiliently maintain the links in the relative position shown in Fig. 5, wherein the valves 39 and 41 are in the closed position as shown in Fig. 4. When the wedge 72 is drawn rearwardly between the links as previously described and as shown in Fig. 6, the links are relatively moved from the position shown in Fig. 5 toward the position shown in Fig. 6, this movement of the links under actuation of the wedge effecting a rotation of the valves from the normal closed position toward the open position in which the channels 37 and 43 are open for passage of the liquid within the casing in the circulation previously described. It will be noted that the end of the link 73 which is connected to the valve 41 is provided with a weight 82, while a corresponding weight 83 is carried by that end of the link 74 connected to the valve 39. Centrifugal force acting on the links through the weights 82 and 83 tends to assist the springs 79 and 81 in returning the links to their normal position shown in Fig. 5 from the adjusted position shown in Fig. 6 following retraction of the actuating wedge 72. The links 73 and 74, as shown in Fig. 7, are confined in the casing 4 between spacer plates 84 and 85 which are shaped to fit the recesses in the casing 4 occupied by the links. It will be apparent from the foregoing description that by longitudinal adjustment of the rod 46 the positions of the valves 39 and 41 may be regulated as required.

In order to provide and to maintain an adequate supply of oil within the pump chamber of the casing 4, the interior of this casing is connected with the crank case and the lubricant-circulating pump of the engine to which the transmission is connected. Thus as shown in Fig. 2, the casing 4 has secured in its forward end a valve casing 86 through which passages 87 and 88 extend to establish communication between the interior of the casing 4 and a chamber 89 in the end of the crank shaft 7. Into this chamber 89 oil is forced by the lubricating pump (not shown) through a pipe 91 and channels 92 and 93. A spring-pressed check valve 94 permits passage of oil from the chamber 89 to the interior of the casing 4, while preventing passage of oil in the opposite direction. The channel 88 is controlled by a second spring-pressed check valve 95 which is opened by a predetermined excessive pressure within the casing 4 and constitutes in effect a relief for undue pressure. The oil is admitted through the passage 87 as described to the interior of the casing 4 at the outer end of the cylindrical member 69 and is permitted to pass through the recesses 71 in this member into the chamber occupied by the links 73 and 74. The links are recessed at 70 to provide free passage of oil past the links. From the inner wall of this chamber ports 96 and 97 extend to the pump chambers 37 and 38 respectively, as shown in Figs. 5 and 7 and Fig. 4. It will be noted that these ports enter the chambers 37 and 38 at those ends of the respective chambers from which the oil is withdrawn by action of the gears 15 and 16. The pump casing is thereby connected to a continuous source of oil supply, and with the action of the gear pump automatically maintains the pump chamber full of oil. At the same time, any undue fluid pressure within the casing 4, due for example to expansion of the oil under rising temperatures, is automatically relieved through these same ports 96 and 97 and through the valve passage 88. This valve arrangement providing for both introduction and discharge of oil from the housing affords means for effecting a continuous flow of oil to and from the casing if desired.

While the casing 4 is substantially oil-tight, and any substantial amount of leakage past the rod 46 and the shaft 13 prevented by the packing 46a and the oil seal 13a, the necessity for precision fitting of the various elements is avoided by providing means whereby any leakage of oil from the casing is returned to the crank case. Such leakage gravitates to the bottom of the housing 1 and accumulates in a receptacle 98, from which it is returned by suitable means such for example as a pipe 99, see Figs. 1 and 2, to the crank case. Such oil as may escape from the casing 4 is effective to lubricate the running parts of the mechanism, and as previously set forth is automatically replenished to the casing from the crank case.

Actuation of the rock shaft 58 to effect adjustment of the valves 39 and 41 is effected in the present instance by means of a pedal 101, see Figs. 1 and 11 to 13 inclusive, which is pivotally mounted in a bracket 102 on the fixed frame or chassis 103 of the motor vehicle. The lower end of the lever 101 is connected by a link 104 to an arm 105 on a shaft 106. One end of the shaft 106 is journaled in the frame 103, while the opposite end is supported on a projecting end of the rock shaft 58, see Fig. 11. This end of the shaft 106 has an upwardly extending arm 107 which has spaced transversely extending lugs 108 which engage opposite side edges of an arm 109 which extends upwardly from the projecting end of the rock shaft 58. In the normal retracted position of the pedal 101, as shown in the drawings, the rock shaft 58 and the casing 55 occupy the positions shown in Fig. 2, and the cam 72 is in the retracted position wherein as previously set forth the valves 39 and 41 under the action of the springs 78 occupy the closed positions as shown in Fig. 4. A spring 111 connected to the pedal 101 also tends to hold the parts in their normal positions of adjustment. As the pedal 101 is depressed, the valves 39 and 41 through the interconnecting parts are adjusted progressively towards the fully open position. It will be noted that the arrangement is such that adjustment of the rod 46 to open the valves withdraws the rod from the casing so that the effective area of the casing chamber is not reduced by this adjustment.

Figures 15, 16:
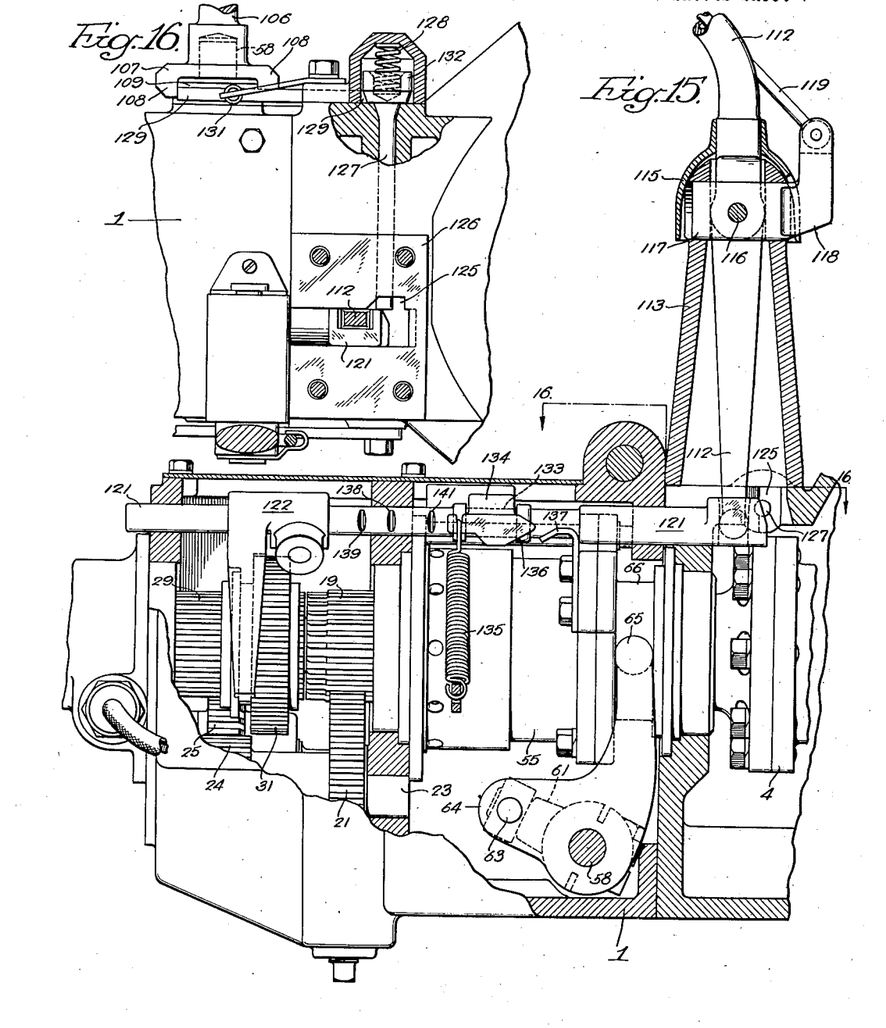
Fig. 15 is an enlarged fragmentary sectional view at the rear end of the transmission housing.
Fig. 16 is a section on the line 16—16, Fig. 15.

The gear or clutch element 31 is shifted to the various alternative positions previously set forth through the medium of a shifting lever 112, which is mounted as shown in Fig. 15 at the top of an extension 113 projecting upwardly from the housing 1. The lever is pivotally mounted for back and forth movement upon a pin 116, and to provide for transverse adjustment of the lever 112, the pin 116 is carried in a cylindrical element 117 journaled for rotation on an axis at right angles to that of the pin 116 in the upper end of the housing extension 113. The element 117 is held against axial displacement by the rectangular projecting head 120 of the pin 116 which extends into a slot 130 in the housing extension 113, see Fig. 1; and the pin 16 is held in place by the bell-shaped case 115 secured to the lever 112. The cylindrical element 117 carries at one end a bracket 118, to which is pivotally secured the lower end of a rod 119, which rod extends longitudinally through the interior of the lever 112, see Fig. 1. The function of this rod 119 will be described hereinafter. The lower end of the lever 112, see Figs. 15 and 16, enters a recess in one end of a rod 121 which is slidably supported in the housing and which carries a depending bifurcated arm 122 which partially embraces and fits into a circumferential groove 123 in the pinion 31, see Figs. 2 and 15, and movement of the upper end of the lever 112 on the pin 116 thus results in a corresponding shifting of the rod 121, and through the arm 122 of the pinion 31.

In Fig. 2, the pinion 31 is shown in a neutral position in which it is disengaged from the idler gear 25 and also from the teeth on the rear end of the shaft 17. The corresponding position of the lever 112 is shown in full lines in Fig. 1, and it will be noted that in this position the upper end of the rod 119 lies substantially flush with the upper face of the knob 124 at the upper end of the shifting lever 112. Rearward movement of the lever 112 to the broken line position designated 112a in Fig. 1 has the effect of shifting the pinion 31 into intermeshed engagement with the teeth on the rear end of the shaft 17, and thereby connects the latter shaft directly with the shaft 28, to which the element 31 is splined. This movement of the lever 112a causes the rod 119 to be somewhat retracted in the lever so that its upper end lies an appreciable distance below the upper surface of the knob 124. Shifting of the lever 112 from its neutral position to the broken line position designated 112b in Fig. 1 shifts the pinion 31 from the neutral position shown in Fig. 2 into mesh with the idler gear 25 and thereby establishes an operative connection between the shaft 17 and the shaft 28 through the medium of the gears 21 and 24. In this connection, the direction of rotation of the shaft 28 is the reverse of the direction of rotation of the shaft 17, and the speed of the shaft 28 with respect to that of the shaft 17 is materially reduced. In this movement of the lever 112, the rod 119 is advanced in the lever so that its upper end projects beyond the surface of the knob 124. This rod 119, or the relative position of the upper end of the rod with respect to the surface of the knob 124, thereby provides an indication of the adjusted position of the gear shift lever 112.

Figures 11, 12, 14:
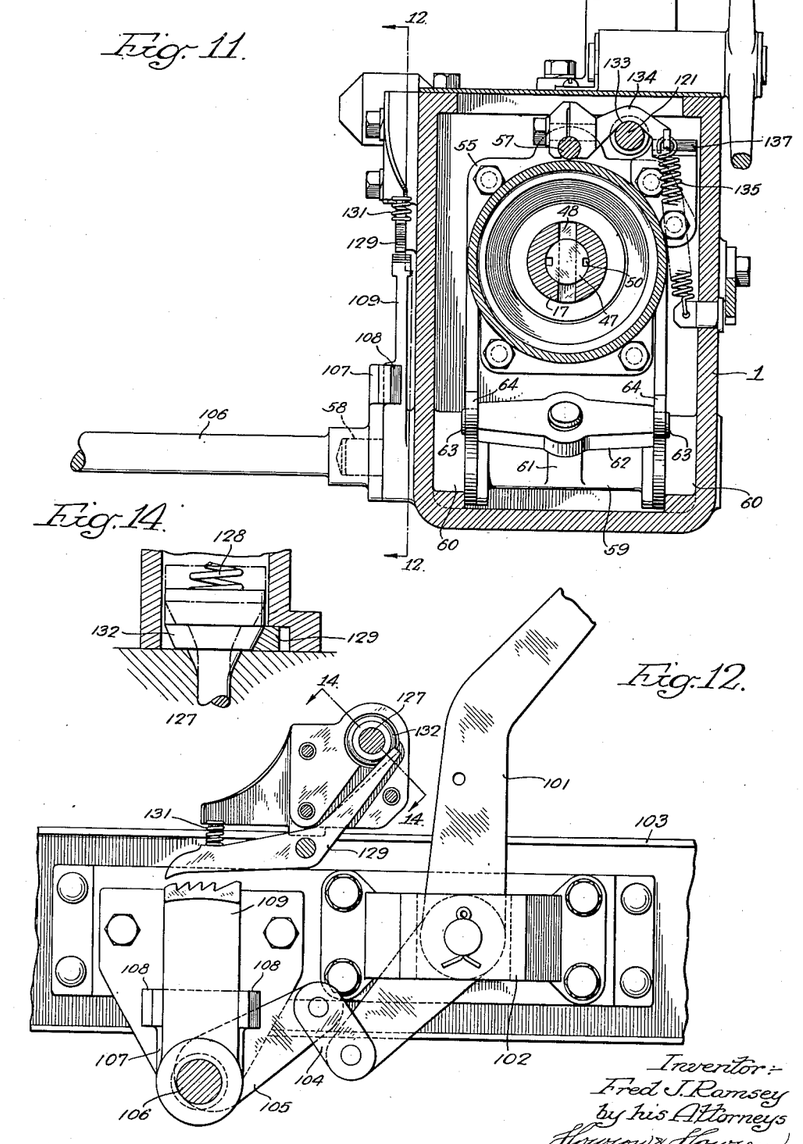
Fig. 11 is a transverse sectional view on the line 11—11, Fig. 2.
Fig. 12 is a section on the line 12—12, Fig. 11.
Fig. 14 is a section on the line 14—14, Fig. 12.

It will be noted by reference to Fig. 16 that when the gear shift lever 112 is shifted rearwardly to the position designated 112a, in which position the shaft 17 is directly coupled with the shaft 28 through the clutch element 31, the lower end of the lever 112 is brought into a position adjoining a recess 125 in the guide plate 126 which normally prevents transverse movement of the lower end of the lever. This recess 125 permits transverse rocking of the lever with the cylinder 117. When the lever is thus transversely shifted, it engages and forces outwardly from the normal position a rod 127 slidably supported in the housing 1, this movement of the rod being opposed by a spring 128 at the outer end of the rod which normally retains the rod in the position in which it is shown in Fig. 16. This outward shifting of the rod 127, as shown in Figs. 12 and 14, permits one end of a pivoted lever 129 to move under the pressure of a spring 131 behind the head element 132 of the said rod and thereby retains the rod in the extended position against the pressure of the spring 128. The other end of the lever 129 constitutes a detent which when depressed by the spring 131 engages in one of a series of notches in the ratcheted upper end of the arm 109 of the rock shaft 106, and thereby retains the rock shaft in its then adjusted position. Since as previously described the adjusted position of the rock shaft 106 determines the position of adjustment of the valves 39 and 41, it is apparent that the valves can be retained by this means in a desired position of adjustment even though pressure is removed from the pedal 101. By reason of the relative position of the lever 129 with respect to the aforesaid ratchet and to the head 132 of the rod 127, any subsequent pressure applied to the pedal 101 will shift the lever 129 by cam action of the ratchet teeth against the detent to an extent retracting the other end of the lever from behind the head 132 of the rod 127 whereupon the spring 128 will act to return this rod to its original normal position, assuming, of course, that pressure has been removed from the lever 112, permitting transverse rocking of this lever with the cylinder 117 to its original normal position.

When the valves 39 and 41 are closed and as previously described, the gears 15 and 16 are substantially immobilized in the casing 4 so that the rotational movement of the casing is transmitted directly to the gear 14, the shaft 13 and the shaft 17. Under these conditions, assuming that the clutch element 31 is in the neutral position as shown in Fig. 2, it is undesirable to attempt to shift this element into engagement with the teeth on the end of the rotating shaft 17. To prevent such shifting of the clutch element 31 until the valves 39 and 41 have been shifted by depression of the pedal 101 to the open position, wherein as previously set forth the rotational movement of the casing 4 is not transmitted to the gear 14, I provide the rod 121 with a recess 133 which, when the element 31 is in the neutral position as shown in Fig. 15, receives a pivoted detent 134, see also Fig. 11, which shows the detent secured to and rockable with the rod 57. A spring 135 engages the free end of the detent 134 and holds it resiliently upon the shift rod 121 and in the recess 133 whereby in this position the detent prevents longitudinal movement of the rod 121 and any corresponding movement of the lever 112. The free end of the detent 134 is provided with a cam surface 136 which lies in the path of a cam element 137 on the casing 55, which casing as previously set forth is shifted by depression of the pedal 101. In this manner, assuming that the element 31 is in the neutral position, it is impossible to move the lever 112 to shift this element 31 until such time as the pedal 101 has been depressed to thereby open the valves 39 and 41, since such movement of the pedal 101 is required to bring the element 137 into engagement with the cam surface 136 to elevate the detent 134 and to thereby free the rod 121 for longitudinal movement. Following the movement of the rod 121 from the neutral position in either direction, the detent 134 will be supported until such time as the rod 121 can return to the neutral position, whereupon it is automatically returned to the locking position within the recess 133. It will be noted that the rod 121 is provided with three notches, 138, 139 and 141, which are adapted to be engaged by a spring-pressed detent (not shown) when the rod occupies the respective neutral, direct drive and reverse drive positions whereby the said rod is releasably maintained in the said adjusted positions.

The operation of the transmission will be readily understood from the foregoing description. In starting the motor, the operator will either assure himself by means of the indicator rod 119 that the pinion 31 is in the neutral position or will depress the pedal 101 to open the valves 39 and 41. Assuming that the clutch element 31 is in the neutral position and the motor started, the operator will depress the pedal 101 to open the valves 39 and 41 and to release the rod 121 from the detent 134 to permit shifting of the clutch element 31 either to directly connect the shaft 17 with the shaft 28 or to bring the gear 31 into mesh with the idler gear 25 for reverse movement. Assuming the clutch element 31 to be shifted into the direct drive position, the operator then slowly releases the pedal 101 and simultaneously accelerates the motor, thereby imposing a progressively increasing torque upon the gear 14 and through the transmission on the propeller shaft of the motor vehicle. When the vehicle has attained sufficient forward speed, the operator entirely releases the pedal 101, which effects complete closing of the valves 39 and 41 and establishes a substantially direct drive connection between the motor and the propeller shaft. All adjustments of the valves and other adjustable parts may be effected while the mechanism is in operation and the parts rotating.

It will be noted that this operation of the pedal 101 corresponds closely to the operation of the clutch pedal on the standard motor car transmission, but the necessity for shifting gears is entirely avoided. If by reason of an upgrade the load on the motor is in excess of its generated power, the operator can depress the pedal 101 to thereby open the valves 39 and 41 sufficiently to permit the motor to accelerate to the point where its power output is sufficient to meet the load requirement, and if this valve position is to be maintained over any appreciable period of time, the pedal 101 may be locked in its partially depressed position by transversely shifting the lever 112, as previously set forth, to bring the detent 129 into cooperative relation with the arm 109. If it is desired to stop the vehicle on an upgrade, this can be accomplished and the vehicle held stationary without use of the brake by merely depressing the pedal 101 to the point where the fluid slip in the gear pump mechanism is just sufficient to hold the vehicle from reverse movement. Retardation of the speed of the vehicle at any time may also be effected without use of the brake through actuation of the pedal 101. To reverse the direction of movement of the vehicle, the clutch pinion 31 may be shifted through the medium of the lever 112 into mesh with the idler gear 25, as previously set forth, the accompanying actuation of the pedal 101 being the same as for the forward movement.

The transmission has certain highly desirable characteristics, including that of relatively low production and maintenance cost. For an equal power transmission, it permits lower floor boards and relieves the crank shaft bearings by reason of absence of overhang load and foot pressure or hydraulic pressure on the clutch when shifting gears, as in the standard transmission.

As previously set forth, the unit does not require in construction any precision machining, and commercial fits between the operating parts are permitted. It is desirable even in the direct drive relation and with the valves 39 and 41 fully closed to maintain a slight rotational movement of the gears 15 and 16 on their respective axes to thereby avoid tendency of these gears and of the gear 14 with which they mesh to develop flats in the event that their relative rotational movement is entirely prevented. The compactness of the transmission and the relatively short shafts permit the use of relatively small bearings and the elimination of spring in the shafts, which not only insures a relatively high operating efficiency but also a relatively slow deterioration and consequent low upkeep. The mechanism also avoids the considerable loss of power in the standard gear shift transmission resulting from the necessity for driving several gears in mesh in a bath of oil, particularly in cold weather when the oil tends to congeal. In the present transmission, any increased viscosity of the oil due to low temperatures has a reverse effect upon the efficiency of the transmission, since it utilizes oil pressure to immobilize the rotating gears in the casing in the transmission of power from the power source to the driven shaft.

I claim:

1. An hydraulic transmission comprising a rotary closed casing, a sun gear journaled concentrically within the casing, a plurality of planetary gears also journaled in the casing and meshing with the sun gear, said planetary gears being adapted when rotated on their own axes to set up a positive circulation of liquid contained within the casing, means including a plurality of rotary valves for regulating the said circulation to variably control the movements of the planetary gears with respect to the casing, links pivotally connected with said valves, and means for relatively adjusting said links to thereby effect synchronized adjustments of said valves, said adjusting means comprising a wedge-shaped cam interposed between and engaging said links, resilient means urging the links against said cam, means for actuating the cam to relatively move the links against the pressure of said resilient means, and weights operatively associated with said links and tending to adjust the links to the valve-closing positions by centrifugal action when the said casing is rotated.

2. An hydraulic transmission comprising a rotary closed casing, a sun gear journaled concentrically within the casing, a planetary gear also journaled in the casing and meshing with the sun gear, said planetary gear being adapted when rotated on its own axis to set up a positive circulation of liquid contained within the casing, means including a valve for regulating the said circulation to variably control the movement of the planetary gear with respect to the casing, resilient means tending normally to maintain the valve in closed position, centrifugal means operative when the casing is rotated to also adjust the valve to the closed position, and means rotatable with the casing for progressively adjusting the valve into the open position, said means comprising a cam mounted for adjustment axially of the sun gear, means for adjusting the cam, and means for operatively connecting the cam with the valve.

3. An hydraulic transmission comprising a rotatable closed casing, a shaft journaled concentrically in the casing, a gear wheel fixed to the shaft in the interior of the casing, a second gear journaled in the casing and meshing with the gear wheel first named, said second gear being arranged in the casing so that relative rotation thereof with respect to the casing will set up a positive circulation of liquid contained in the casing, a rotary valve for controlling said circulation to variably resist said relative rotation, and means for actuating said valve comprising a valve-actuating rod axially mounted and longitudinally slidable in said shaft, a crank on said valve, a link connected with the crank and extending transversely of said shaft, and a cam on said rod operatively engaging said link.

FRED J. RAMSEY.